US008243096B2

(12) United States Patent
Fowler et al.

(10) Patent No.: US 8,243,096 B2
(45) Date of Patent: Aug. 14, 2012

(54) METHOD AND APPARATUS FOR GENERATING A PLURALITY OF STENCIL REFERENCE VALUES FOR A CORRESPONDING PLURALITY OF PIXELS OR PIXEL SAMPLES

(75) Inventors: Mark Fowler, Hopkinton, MA (US); Christopher J. Brennan, Holden, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 976 days.

(21) Appl. No.: 11/686,524

(22) Filed: Mar. 15, 2007

(65) Prior Publication Data
US 2008/0225049 A1    Sep. 18, 2008

(51) Int. Cl.
*G09G 5/00*    (2006.01)
(52) U.S. Cl. ...................................................... 345/619
(58) Field of Classification Search .................. 345/422, 345/619–628
See application file for complete search history.

(56) References Cited

OTHER PUBLICATIONS

The OpenGL Programming Guide : The Official Guide to Learning OpenGL, Release 1.1. 2nd ed. New York: Addison-Wesley Longman, Limited, 1997.*
Mitchell, Jason L. et al.; Applications of Explicit Early-Z Culling; SIGGRAPH 2004—Real-Time Shading Course; pp. 14-1-14-9.

* cited by examiner

*Primary Examiner* — Xiao M. Wu
*Assistant Examiner* — Scott E Sonners
(74) *Attorney, Agent, or Firm* — Faegre Baker Daniels LLP

(57) ABSTRACT

Based on a driver programmable stencil reference value command, stencil reference value logic produces a plurality of stencil reference values for a corresponding plurality of pixels or pixel samples. At least one of the plurality of stencil reference values has a different value than at least one other of the plurality of stencil reference values. The driver programmable stencil reference value command may include a reference to instruction data or instruction data itself such that the graphics processing logic produces the plurality of stencil reference values based on the instruction data. Stencil logic performs a stencil test on the produced plurality of stencil reference values with respect to or without reference to a previously produced plurality of stencil values. Stencil logic performs stencil operations based on the result of the stencil test.

36 Claims, 6 Drawing Sheets

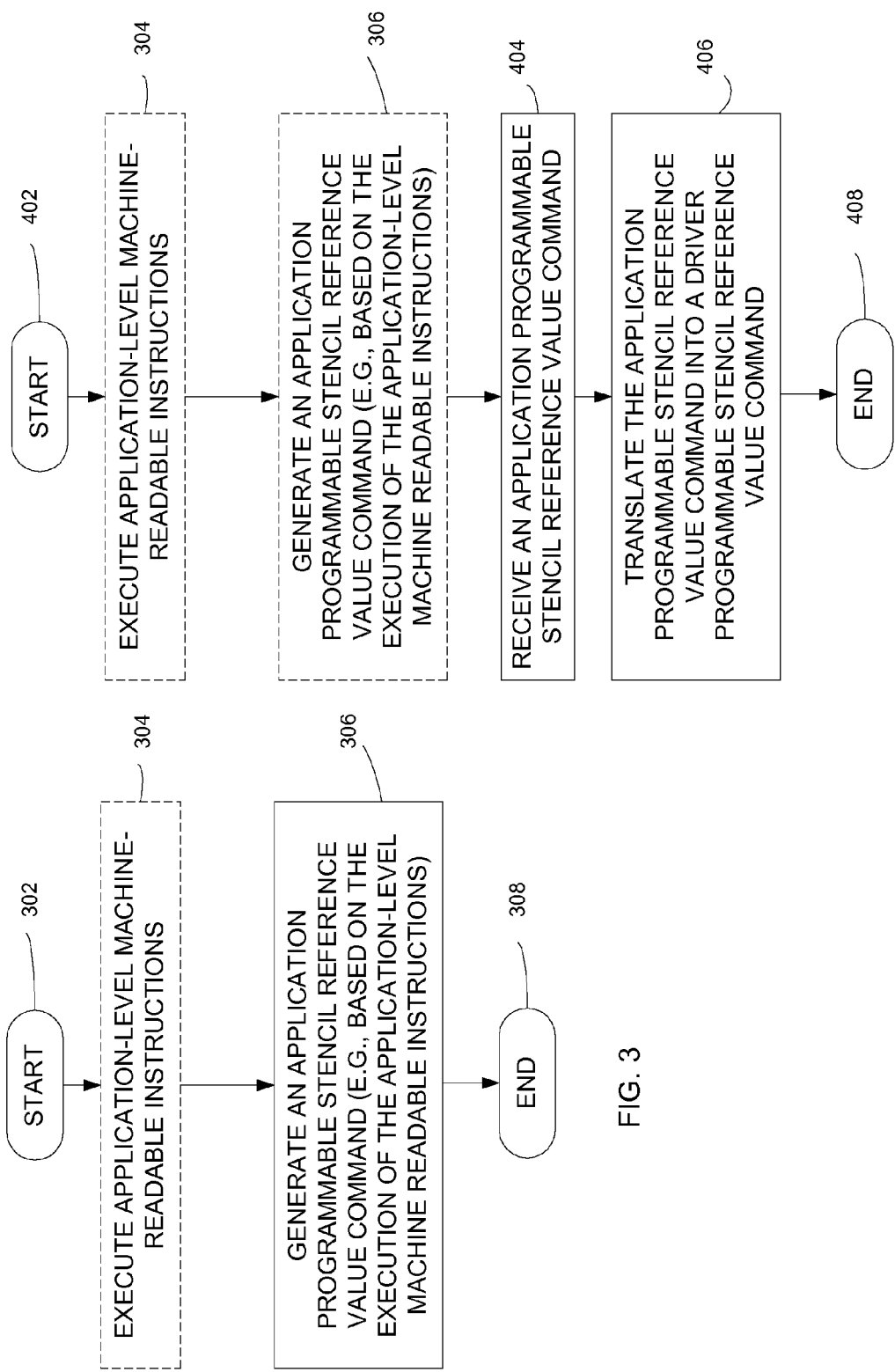

METHOD AND APPARATUS FOR GENERATING A PLURALITY OF STENCIL REFERENCE VALUES FOR A CORRESPONDING PLURALITY OF PIXELS OR PIXEL SAMPLES

FIELD OF THE INVENTION

The invention generally relates to processing computer graphics information for display and, more particularly, to utilizing stencil reference values in a computer graphical system.

BACKGROUND OF THE INVENTION

In the field of computer graphics, commands from an application are used to render primitives of one or more graphical objects. As used herein, to render primitives of one or more graphical objects refers to the process of generating pixel data or pixel sample data. The rendered data is generally buffered and displayed on a suitable display device. Modern systems often incorporate, but do not require, a central processing unit ("CPU") separate and distinct from a graphics processing unit ("GPU"). However, it is recognized that other systems may use different cores of one or more processors to dynamically allocate or otherwise divide the processing load among the cores. At any given time, a particular core may act as a traditional CPU or traditional GPU. Accordingly, references to a CPU and a GPU herein are not intended to be limiting to any specific structure or function but are merely used to differentiate among traditional types of processing resources and/or processing. Generally, the CPU is responsible for sending commands to the GPU for rendering thereon. The GPU renders graphics objects and displays them on a display device more quickly than if a CPU were used to draw the same to the display. Commands from the CPU generally include a variety of state commands and their associated draw commands. For example, a CPU may issue a single draw command to render and draw one or more primitives associated with a graphics object. The state commands may "set" a particular state or condition associated with an associated draw command.

As is known, primitives may include one or more vertices (e.g., three vertices). A draw command minimally consists of the location of the vertices (e.g., in world space coordinates) associated with the one or more primitives of the graphics object to be rendered. Associated state commands may indicate a variety of additional information relevant for the particular draw or rendering. State commands may include attribute values associated with primitive vertices and other constant data associated with the one or more primitives in the graphics object. For example, when a particular draw command requires use of a stencil test, one having ordinary skill in art will recognize that a single stencil reference value for all primitives in the draw command (i.e., for all pixels or pixel samples in the graphics object) may be passed as a state command or as part of a state command. The stencil reference value is generally an 8-bit value. Accordingly, using information contained within draw and state commands, the GPU performs a variety of transformations on the data and may generate display data corresponding thereto.

In prior art systems, the CPU includes one or more host processors ("host processor") that execute instructions associated with an application and a driver. The instructions may be stored in memory, coupled to the host processor, as modules. With respect to the host processor, memory may be, for example, on chip, off chip, dedicated, distributed, integrated and/or shared, as is known in the art. The state and draw commands are generally provided by the driver executing on the host processor in response to received render commands from the application which is also executing on the host processor. As the host processor executes instructions associated with the application, a plurality of application render commands to display one or more graphical objects are generally generated. The driver then translates or compiles the application render commands into commands that are understandable by the GPU. The translated commands (i.e., the state and draw commands) are then communicated to the GPU for processing thereon (e.g., over a suitable bus).

As is known, it is common to issue draw and/or state commands that call for the performance of a stencil test. The stencil test is performed on a pixel or pixel sample basis within the graphics object and may or may not require the comparison of the provided stencil reference value with the respective previously stored stencil value for the respective pixel or pixel sample. Based on the Z and/or stencil test, as is known in the art, the GPU writes or otherwise updates the memory storing the stencil values using a corresponding stencil operation. Exemplary stencil tests include: "greater than?", "less than?", "greater than or equal to?", "less than or equal to?", "equal to?", "not equal to?", "always" and "never". One having ordinary skill in the art will recognize that the "always" and "never" tests do not specifically require a comparison of a current stencil reference value and a stored stencil value as the test will either always pass or never pass. Common stencil operations may include, for example: "keep", "increment", "decrement", "increment and clamp", "decrement and clamp", "replace", "zero" and "invert". Other stencil tests and operations may be employed. Accordingly, the state commands might either reference which stencil test and/or stencil operation to use or may physically pass the instructions necessary to carry out the stencil test and/or stencil operation. Alternatively, the GPU may be programmed or otherwise configured to run a given stencil test and/or stencil operation.

Generally, the GPU interacts with memory (e.g., on chip, off chip, dedicated, distributed, integrated and/or shared) to store data necessary for the rendering and display of the final pixels and pixel samples on the screen. As appreciated, the memory may often be of limited size and may be shared with other processing units (e.g., the CPU). The GPU, when performing a stencil operation, may write the resulting stencil value to a stencil buffer (i.e., memory or a portion of memory) for quick access. In some systems, the stencil buffer is termed a Z/stencil buffer because it may also store Z data in addition to stencil values and related stencil data (e.g., stencil metadata). Because of the attributes of the stencil buffer (i.e., its location and accessibility), it may be desirable, in certain situations, to write other types of data thereto for use in the rendering process. However, as appreciated by those of ordinary skill in the art, the stencil values may not merely be written over if needed in a subsequent stencil test. Accordingly, while other data may be written to the stencil buffer, the stencil values must be moved or copied to another memory location. At a later time, the moved stencil values must be moved or copied back to the stencil buffer for a subsequent stencil test or other known operation.

Similarly, stencil values might be needed for use in another capacity by other logic blocks in a computer graphics system. For example, an application (e.g., executing on a host processor) may desire to view the stencil data via a command known in the art as a direct CPU access. In such cases, the stencil values might need to be moved to a more convenient location for this capacity (e.g., memory affiliated with the host processor) and then moved back to the stencil buffer when stencil testing needs to continue.

In the cases described above, the stencil values are moved from the stencil buffer using known memory access commands that directly access the stencil buffer and do not require use of the stencil block or stencil logic (i.e., the portion of the GPU that actually performs the stencil test and writes stencil values to the stencil buffer or otherwise updates stencil values previously stored in the stencil buffer). The stencil block/logic is described in further detail below.

Moving stencil values from the stencil buffer and writing stencil values back to the stencil buffer may prove difficult in graphical systems employing proprietary formatting schemes and/or proprietary compression schemes. For example, a GPUs may have a stencil block/logic that employs specific proprietary tiling schemes and/or compression schemes when it writes stencil values to the stencil buffer. As a result, only the stencil block/logic understands how to read the stencil values stored in the stencil buffer. Similarly, only the stencil block/logic understands how to write stencil values to the stencil buffer. Accordingly, after a stencil value move, a need exists in graphics systems employing proprietary formatting and/or compression schemes, for providing to the stencil block/logic the previously moved stencil values for reformatting and/or compression and storage in the stencil buffer.

Additionally, and as provided above, prior art draw commands were limited to passing a single stencil reference value for each draw command (i.e., for all pixels or pixel samples for all primitives in the graphics object associated with the draw command. The provision of a single stencil reference value per draw command, however, does not provide an application designer maximum flexibility in programming. Accordingly, a need exists to allow the provision of multiple stencil reference values for a draw command where each pixel or pixel sample has its own programmable stencil reference value. Thereafter, stencil tests and operations may be performed on the programmable stencil reference values. Such a solution would give application designers additional flexibility in rendering graphic objects. For example, an application designer could then use the programmable stencil reference values as a way of tagging certain pixels or pixel samples in a graphics objects such that the tagged pixels or pixel samples are the only portions of a particular graphics object that are processed, rendered or displayed or such that the tagged pixels or pixel samples are the only portions of the graphics object that are not processed, rendered or displayed.

A further need exists for allowing application designers the ability to write application-level machine-readable computer code (e.g., source code in OpenGL, D3D, etc.) for applications wherein the compiled computer code directs the provision of: (1) previously moved stencil values (e.g., as a result of limited memory resources) or (2) generated programmable stencil reference values (e.g., as determined by the application designer) to the stencil block/logic. That is, a need exists for a new command available to application designers that allow for the above functionality. An additional need exists for a driver that understands the new application-level commands and is capable of translating the commands into a corresponding command understandable by a GPU.

BRIEF DESCRIPTION OF THE DRAWINGS

The invention will be more readily understood in view of the following description when accompanied by the below figures and wherein like reference numerals represent like elements:

FIG. 3 is a flow chart illustrating one example of a method for generating an application programmable stencil reference value command in accordance with one embodiment of the present disclosure;

FIG. 4 is a flow chart illustrating one example of a method for generating a driver programmable stencil reference value command in accordance with one embodiment of the present disclosure;

DETAILED DESCRIPTION

Generally, the present disclosure provides a method and apparatus for the production of a plurality of stencil reference values for a corresponding plurality of pixels or pixel samples, wherein at least one stencil reference value of the plurality of stencil reference values is different than another stencil reference value of the same plurality. In one embodiment, this is accomplished, at least in part, by application logic that generates an application programmable stencil reference value command and wherein the application logic may be coupled in operation to graphics processing logic. The graphics processing logic, based on the application programmable stencil reference value command, is capable of producing the plurality of stencil reference values.

In another embodiment, the production of the plurality of stencil reference values for the corresponding plurality of pixels or pixel samples is implemented using driver logic that may be coupled to the application logic and also to the graphics processing logic during operation. The driver logic translates the application programmable stencil reference value command into a driver programmable stencil reference value command that is understandable by the graphics processing logic. Based on the driver programmable stencil reference value, the graphics processing logic produces the plurality of stencil reference values for the corresponding plurality of pixels or pixel samples.

In one embodiment, the graphics processing logic includes stencil reference value generator logic that produces the plurality of stencil reference values based on the driver stencil reference value command. The graphics processing logic further includes stencil logic that is coupled to memory and is further capable of performing stencil tests on the produced plurality of stencil reference values for the corresponding plurality of pixels or pixel samples with respect to or without reference to a previously produced plurality of stencil values stored in memory.

In the following detailed description, numerous specific details are set forth in order to provide a thorough understanding of the present disclosure. It will be apparent to one of ordinary skill in the art, however, that these specific details need not be used to practice the present disclosure. In other instances well-known structures, interfaces and processes have not been shown or described in detail in order not to unnecessarily obscure the present invention.

Figure 1:
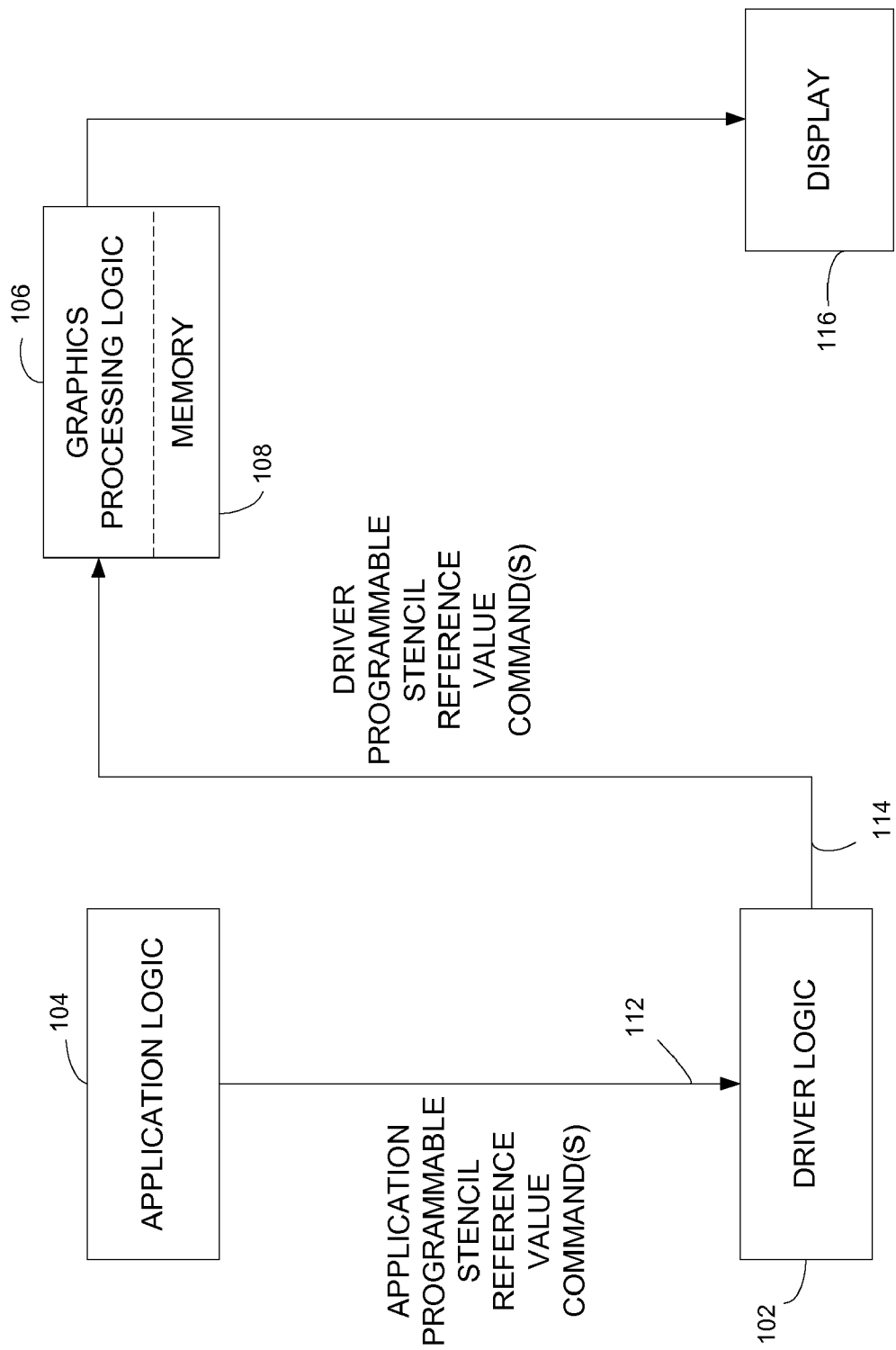
FIG. 1 is a block diagram illustrating one example of application logic that generates an application programmable stencil reference value command, driver logic that generates a driver programmable stencil reference value command and graphics processing logic capable of being controlled by the driver programmable stencil reference value command in accordance with one embodiment of the present disclosure.

FIG. 1 is a block diagram illustrating one example of application logic 104 that generates an application programmable stencil reference value command 112, driver logic 102 that generates a driver programmable stencil reference value command 114 and graphics processing logic 106 capable of being controlled by the driver programmable stencil reference value command 112 in accordance with one embodiment of the present disclosure. As illustrated, driver logic 102 is coupled to application logic 104, and graphics processing logic 106 either includes or is coupled to memory 108. Graphics processing logic 106, in turn, is also coupled to a suitable display device 116 such as, for example, a CRT, display device, LCD, etc. Application logic 104 may be programmed or programmable to generate application programmable stencil reference value command 112. Driver logic 102 generates driver programmable stencil reference value command 114 based on the application programmable stencil reference value command 112. In one embodiment, driver logic 102 and application logic 104 reside on or are affiliated with a central processing unit ("CPU") or any other suitable processing entity separate from the graphics processing logic 106. Driver logic 102 and application logic 104 may be one or more integrated circuits or integrated circuit packages. In another embodiment, driver logic 102 resides on the same integrated circuit or integrated circuit package as the graphics processing logic 106 or may otherwise be a component of the graphics processing logic 106. In yet another embodiment, each of application logic 104 and driver logic 102 may reside on individual integrated circuits or integrated circuit packages.

As used herein, driver logic 102, application logic 104 and graphics processing logic 106 refer to logic (i.e., logical blocks) that perform a specified function and may be implemented in any number of recognized ways. For example, driver logic 102, application logic 104 and graphics processing logic 106, individually or collectively, may be implemented as one or more of the following: hardware components (programmable or non-programmable) such as but not limited to digital signal processors, accelerators, engines, application specific integrated circuits ("ASICs"), etc. or software modules containing executable instructions capable of being executed on one or more processors or combinations of hardware and software. In one embodiment, graphics processing logic 106 is a graphics processing unit having a similar structure as the CPU described above, as known in the art. Graphics processing logic 106 is described in further detail with respect to at least FIGS. 4 and 5.

Application programmable stencil reference value command 112 is one or more commands (e.g., state and/or draw commands) calling for the production (i.e., the act of obtaining through reading, generation, etc.) of a plurality of stencil reference values for a corresponding plurality of pixels or pixel samples. The pixels or pixel samples or the corresponding plurality of pixels or pixel samples, may be associated with one or more primitives (e.g., triangles). As used herein, the production of the plurality of stencil reference values refers to the process of generating, fetching, finding, locating, or otherwise obtaining stencil data whether pre-existing or not. The application programmable stencil reference value command specifically calls for the production of the plurality of stencil reference values wherein at least one stencil reference value of the plurality of stencil reference values is different than at least one other stencil reference value of the same plurality of stencil reference values, thus overcoming the shortcomings of the prior art.

Memory 108 may be any suitable memory or plurality of suitable memories (e.g., memory devices) similar to that described below with respect to memory 204. In one embodiment, memory 108 and memory 204 are one-and-the-same. In another embodiment, memory 108 resides on the same or different integrated circuit or integrated circuit package as graphics processing logic 106. It should be understood that while memory 204 and memory 108 are each illustrated as one "memory" they may comprise multiple memories (e.g., memory devices) and should not be construed in a limiting manner.

Driver logic 102 is coupled to application logic 104 and is capable of translating or compiling the application programmable stencil reference value command 112 into a driver programmable stencil reference value command 114 so that the graphics processing logic 106 may understand the command. Thereafter the driver logic 102 or any suitable other logic transmits the generated driver programmable stencil reference value command 114 and any other contemporaneous application commands (e.g., state and draw commands), if available, to graphics processing logic 116 for suitable processing. Although not specifically illustrated, the transmission may be any suitable wired or wireless transmission from driver logic 102 to graphics processing logic 106. Processing may require manipulation of data and/or display on display device 106, as known in the art. In one embodiment, the driver programmable stencil reference value command 114 is a state or draw command. In another embodiment, the driver programmable stencil reference value command 114 is part of a state or draw command. In yet another embodiment, the driver programmable stencil reference value command 114 contains a state or draw command. Accordingly, as used herein, the name given to the commands generated by driver 102 (e.g., state, draw, driver programmable stencil reference value) are not intended to limit the physical size or structure of the commands generated by the driver in any manner not expressly stated herein.

The driver programmable stencil reference value command 114 generally corresponds to the application programmable stencil reference value command 112 to the extent that the driver programmable stencil reference value command 114 is the compiled or translated version of the application programmable stencil reference value command 112 thereof. The driver programmable stencil reference value command 114 is further capable of controlling graphics processing logic 106 to produce the plurality of stencil reference values for the corresponding plurality of pixels or pixel samples.

The driver programmable stencil reference value command 114 may include a number of components each of which are described in further detail below: (1) instruction data or any suitable reference (e.g., a flag, pointer, etc.) to instruction data stored in memory; (2) vertex location data associated with one or more primitives of which the corresponding plurality of pixels or pixel samples comprise or any suitable reference (e.g., a flag, pointer, etc.) to the vertex location data; (3) an export bus enable flag; (4) a stencil test mode flag directly or indirectly representing a stencil test and/or stencil operation to be performed on the plurality of stencil reference values. As used herein, the terms flag and pointer individually constitute any suitable indicator such as, but not limited to a bit, series of bits and may, in one embodiment, indicate an address location in memory, e.g., memory 108, where data (e.g., vertex location data or instruction data) is stored. Accordingly, it is recognized that the application programmable stencil reference value command 112 may similarly be capable of conveying the same or similar information.

Figure 2:
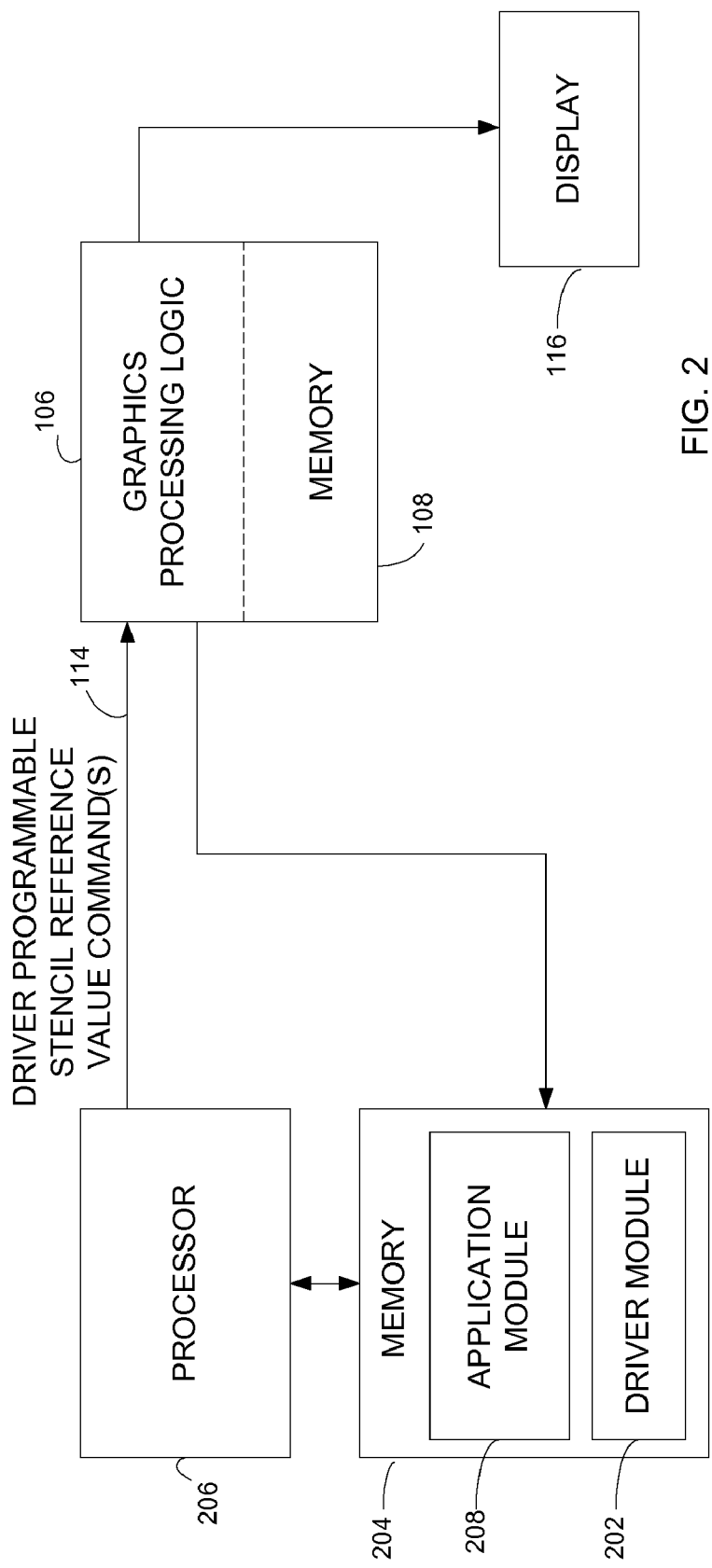
FIG. 2 is a block diagram illustrating a specific example of application logic and driver logic implemented as one or more processors coupled to memory including software modules having executable instructions therein for execution on the one or more processors.

FIG. 2 illustrates driver logic 102 implemented as driver module 202 in memory 204 containing executable instructions capable of being executed by processor 206. Similarly, FIG. 2 illustrates application logic 104 implemented as application module 208 in memory 204 containing executable instructions capable of being executed by processor 206. Processor 206 may be any suitable processing entity comprising one or more processors such as but not limited to one or more microprocessors, CPUs, microcontrollers, digital signal processors, RISC microprocessors, etc. Memory 204 may be any suitable memory or combination of suitable memories (e.g., memory devices) coupled to processor 206 such as but not limited to any suitable volatile or non-volatile storage including but not limited to one or more solid state storage devices (e.g., RAM), mass storage devices (optical discs, magnetic storage devices, etc.), and may further include registers, cache memory, etc. In one embodiment, memory 204 may be located across a network (not shown) in which case suitable network interfaces may be required, as is known in the art. Memory 204 may reside on the same or different integrated circuit or integrated circuit packages as processor 206. Memory 204 may be on chip, off chip, dedicated, distributed, integrated and/or shared, as is known in the art. In one embodiment, application module 204 may be written in any suitable programming language compatible with any suitable application programming interface such as, but not limited to, OpenGL by Silicon Graphics, Inc., DirectX by Microsoft Corporation or Direct3D (also known as D3D) by Microsoft Corporation. Similarly, driver module 202 may be written in any suitable programming language that is capable of translating application render commands 112 into commands understood by graphics processing logic 106.

FIG. 3 is a flow chart illustrating one example of a method for generating an application programmable stencil reference value command in accordance with one embodiment of the present disclosure. The method begins with block 302, wherein, for example (i.e., optionally), an application designer has previously written application-level machine-readable instructions in, for example, a suitable language such as OpenGL. The method continues in block 306 wherein an application programmable stencil reference value command is generated. In one embodiment, the method of block 306 is based on the execution of the application-level machine-readable instructions as the method may include block 304, where application-level machine-readable instructions are executed. In one embodiment, the application-level machine-readable instructions are executed by one or more processors (e.g., one or more host processors associated with a CPU). The application programmable stencil reference value command, in one embodiment, is generated by application logic 104 or by the application module 208 executing on processor 206. The method ends in block 308, wherein for example, the application programmable stencil reference value command is used to control graphics processing logic to produce a plurality of stencil reference values for a corresponding plurality of pixels or pixel samples wherein at least one stencil reference value of the plurality of stencil reference values is different than at least one other stencil reference value of the same plurality of stencil reference values.

FIG. 4 is a flow chart illustrating one example of a method for generating a driver programmable stencil reference value command in accordance with one embodiment of the present disclosure. The method begins in block 402. In one embodiment, block 402 is analogous to block 302. The method continues in block 404 wherein an application programmable stencil reference value command. The method may optionally include blocks 304 and 306 as previously described. The receipt of the application programmable stencil reference value command in block 404 may have been transmitted by, for example application logic 104 of FIG. 1 or may have been passed by application module 208 executing on processor 206 of FIG. 1. The method also includes block 406 which requires the translation of the application programmable stencil reference value command into a driver programmable stencil reference value command. In one embodiment, the translation is performed by driver logic 102 or driver module 202 running on processor 206. The method then concludes in block 408, which in one embodiment, is identical to block 308.

Figure 5:
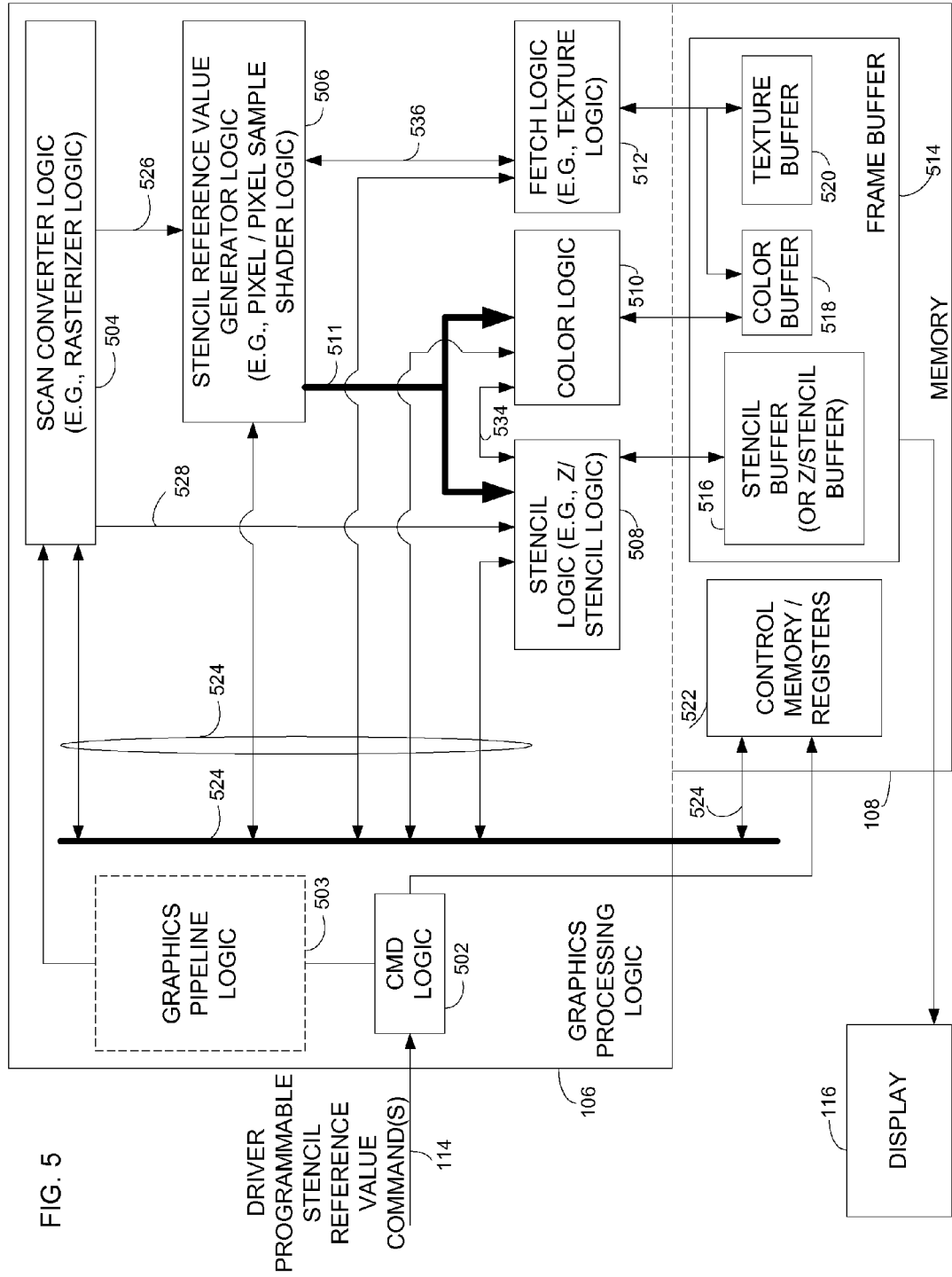
FIG. 5 is a block diagram illustrating one example of graphics processing logic capable of being controlled by a driver programmable stencil reference value command in accordance with one embodiment of the present disclosure.

FIG. 5 is a block diagram illustrating one example of graphics processing logic 106 capable of being controlled by a driver programmable stencil reference value command 114 in accordance with one embodiment of the present disclosure. As illustrated, graphics processing logic 106 is illustrated as including: command logic 502, graphics pipeline logic 503 (optional), scan converter logic 504, stencil reference value generator logic 506, stencil logic 508, color logic 510, fetch logic 512 (collectively, "GPL blocks") and export bus 511. Similar to driver logic 102 and application logic 104, GPL blocks refer to logic (i.e., logical blocks) that perform a specified function and may be implemented in any number of recognized ways. For example, GPL blocks, individually or collectively, may be implemented as one or more of the following: hardware components (programmable or non-programmable) such as but not limited to digital signal processors, accelerators, engines, ASICs, etc. or as software modules containing executable instructions capable of being executed on one or more processors. Memory 108 is coupled to or otherwise accessible by graphics processing logic 108. Memory 108 is illustrated, for purposes of example, as partitioned into various portions of memory including frame buffer 514 and control memory/registers 520 wherein the frame buffer 514 is further illustrated, for purposes of example, as partitioned into various portions including a stencil buffer 516, color buffer 518, and texture buffer 520. Memory 108, specifically frame buffer 514, is coupled to display device 116.

Command logic 502 receives driver programmable stencil reference value command 114 from, e.g., driver logic 102 of FIG. 1. As described above, the driver programmable stencil reference value command 114 may include: (1) instruction data or any suitable reference (e.g., a flag, pointer, etc.) to instruction data stored in memory; (2) vertex location data associated with one or more primitives of which the corresponding plurality of pixels or pixel samples comprises or any suitable reference (e.g., a flag, pointer, etc.) to the vertex location data; (3) an export bus enable flag; (4) a stencil test mode flag directly or indirectly representing a stencil test and/or stencil operation to be performed on the plurality of stencil reference values. Each of these components may be written to memory 108 (e.g., control memory/registers 522) and later read out by one or more of the GPL blocks as discussed in more detail below.

In one embodiment, driver programmable stencil reference value command 114 includes additional information or attribute values necessary for a given operation. For example, driver programmable stencil reference value command 114 may not be an independent command but may, as provided above, be a state or draw command, be part of a state or draw command, or may include a state or draw command. In any event, command logic 402 may further write additional attribute data or control information (e.g., flags, indicators, etc.) to memory (e.g., control memory 522) for subsequent used by one or more GPL blocks.

Memory 108, specifically, control memory 522 is coupled at least to scan converter logic 504, stencil reference value generator logic 506, and stencil logic 508 to provide stored data to components of graphics processing logic 106, as known in the art. The provision of the stored data may be made using any known technique. In one embodiment, each GPL block regularly requests data from the control memory 522. For purposes of illustration only, FIG. 5 shows bus 524 coupling control memory 522 to the GPL blocks. Any suitable coupling (e.g., one or more buses or any wireless coupling) may be used. In one embodiment, control memory 522 is one or more control registers or array of control registers.

Command logic 502 is coupled to scan converter logic 504 (also known as rasterizer logic). In one embodiment, graphics pipeline logic 503 is coupled between command logic 502 and scan converter logic 504 and may perform a variety of rendering transformations and/or operations on vertex data, graphics object data (e.g., pixel or pixel sample data), or attribute data related thereto. Resulting data may be passed to scan converter logic 504 as illustrated. It is conceived and recognized that graphics pipeline logic 503 and other additional graphics pipeline logic may be incorporated into graphics processing logic 106 to perform established rendering techniques and other rendering procedures.

Scan converter logic 504 generates location data 526 (e.g., in screen space coordinates) for each pixel or each pixel sample of the corresponding plurality of pixels or pixel samples based on vertex location data. In one embodiment, the vertex location data is the location (e.g., in screen space coordinates) of one or more primitives of which the plurality of pixels or pixel samples comprise. That is the vertex location data defines the primitives and indirectly its pixels or pixel samples upon which the driver programmable stencil reference value command 114 operates. As is known in the art, vertex location data or a reference thereto, may be provided by one of: command logic 502, graphics pipeline logic 503 or memory (e.g., control memory 522). A reference to vertex location data, as described above, may provide information directing the scan converter logic 504 to the stored location of the vertex location data. For example, the reference to vertex location data may be one or more bits that instruct the scan converter logic 504 to check a particular memory location for the vertex location data.

Scan converter logic 504 may also provide additional rendering functions such as, but not limited to interpolating Z/depth values 528 storage by Z/stencil logic. Z/stencil logic is illustrated as one embodiment of stencil logic 508; however, Z logic (not specifically shown) may also be separate and distinct from stencil logic 408. In another embodiment, scan converter logic 504 may interpolate additional attributes for pixels or pixel samples such as, but not limited to color, light, texture, etc.

Stencil reference value generator logic 506 (e.g., pixel shader logic or pixel sample shader logic) is coupled to scan converter logic 504 and receives therefrom the generated location data for each pixel or pixel sample of the corresponding plurality of pixels or pixel samples. Stencil reference value generator logic 506 is also coupled to receive one of: instruction data or a reference to instruction data from memory (e.g., control memory 522). The reference to the instruction data, like the reference to location data, may provide information directing the stencil reference value generator 506 to the stored location of the instruction data. For example, the reference to instruction data may be one or more bits that instruct the stencil reference value generator 506 to check a particular memory location for the instruction data. Correspondingly, the stencil reference value generator 506 uses the instruction data and the location data 526 to produce the plurality of stencil reference values. In other words, the stencil reference value generator logic 506 uses the instruction data to produce the plurality of stencil reference values as a processor might execute a program.

The instruction data instructs the stencil reference value generator logic 506 to produce the plurality of stencil reference values 511 by reading them from memory based at least on the location data 526 for each pixel or pixel sample of the corresponding plurality of pixels or pixel samples. Alternatively, the instruction data instructs the stencil reference value generator logic 506 to generate the plurality of stencil reference values 511 based at least on the location data 526 for each pixel or pixel sample of the corresponding plurality of pixels or pixel samples. In both cases, the stencil reference value generator logic 506 uses the instruction data to produce the plurality of stencil reference values 511 similar to how executable instructions might instruct or cause a processor to perform a certain task. Thus, the location data can be considered an input to the program (i.e., the instruction data).

In the former case, where stencil reference value generator logic 506 reads the plurality of stencil reference values 511 from memory, stencil reference value generator logic 506 may use any suitable technique to read pre-existing stencil reference values from any suitable memory location. In one embodiment, the stencil reference value generator logic 506 reads the plurality of stencil reference values from the color buffer 518 or the texture buffer 520. In another example, the stencil reference value generator logic 506 reads the plurality of stencil reference values from memory 204 associated with one or more host processors. The plurality of stencil reference values may have been stored in the suitable memory from a previous command or commands. For example, driver logic 102 may have previously transmitted any suitable command to graphics processing logic 106 instructing stencil logic 508 to read the plurality of stencil reference values from the stencil buffer 416 and to write the plurality of stencil reference values to, e.g., color block 510 along data path 534. In turn, color block 510 would have written the received plurality of stencil reference values to color buffer 518.

In one embodiment, the stencil reference value generator logic 506 reads the plurality of stencil reference values from memory by issuing a fetch instruction 536 to fetch logic 512 operatively coupled to memory 108 and to the stencil reference value generator logic 506. In response thereto, the fetch logic 512 access the requested plurality of stencil reference values and passes them to the stencil reference value generator logic 506. One having ordinary skill in the art will recognize that the location data 426 may be used to identify which stencil reference values are fetched by the fetch instruction 536.

In the latter case, where stencil reference value generator logic 506 generates the plurality of stencil reference values based at least on the location data 526, the instruction data serves to instruct stencil reference value generator logic 506 as to the manner in which the plurality of stencil reference values is to be generated. In one embodiment, the instruction data is a program or series of instructions that the stencil reference value generator logic 506 executes to generate the stencil reference values 511. In another embodiment, the instruction data serves to initiate a known function (e.g., a previously programmed function, as known in the art) of stencil reference value generator logic 506. For example, stencil reference value generator logic 506 may be designed such that in response to the instruction data, a known routine is initiated to generate the plurality of stencil reference values.

Upon producing the plurality of stencil reference values, stencil reference value generator logic 506 exports the produced plurality of stencil reference values to stencil logic 508 using any suitable coupling. In one embodiment, stencil reference value generator logic 506 exports the produced plurality of stencil reference values to stencil logic 508 using an export bus 511 that directly couples stencil logic 508 to stencil reference value generator logic 506. In one embodiment, the export bus 511 also directly couples color logic 510 to stencil reference value generator logic 506. The export bus 511 may be also known as a color bus, however, it is understood that the export bus 511 may be used to send any other data to stencil logic 508 and/or color logic 510 during other rendering operations. For example, the export bus 511 may transmit depth or Z information or color information to the respective logic. In one embodiment, the export bus 511 supports four channels of data wherein each channel is capable of exporting a floating point vector. The plurality of stencil reference values may be exported along any suitable channel. Accordingly, in one embodiment, the driver programmable stencil reference value command 114 may include an export bus enable flag such that, in response to the export bus enable flag, the stencil reference value generator logic 506 transmits the plurality of stencil reference values to the stencil logic 508 and the stencil logic 508 recognizes the transmitted plurality of stencil reference values as such.

Upon receipt of the plurality of stencil reference values 511 by stencil logic 508, stencil logic 508 may perform any suitable stencil test or stencil operation as may be known in the art. The driver programmable stencil reference value command 114 may include a stencil test mode flag that specifies the specific stencil test and/or stencil operation to be performed. Alternatively, stencil logic 508 may be preprogrammed using any suitable technique to perform a specific stencil test and/or stencil operation. As illustrated, stencil logic 508 is coupled to memory, specifically, stencil buffer 516. The stencil buffer 516 contains previously produced stencil values for the same plurality of pixels or pixel samples and may be accessed by stencil logic 508 during the performance of a stencil test, if necessary. Based on the result of the stencil test for each of the plurality of pixels or pixel samples, stencil logic 508 may then perform a suitable stencil operation and update the stencil buffer 516 accordingly. For example, stencil logic 508 may update a stencil value in the stencil buffer 516 or stencil logic 508 may replace a stencil value in the stencil buffer 516 with the currently produced stencil reference value from the plurality of stencil reference values 511. In one embodiment, stencil logic 508 employs one or more proprietary or customized formatting schemes (e.g., tiling and/or compression) in writing stencil values to the stencil buffer 516.

Figure 6:
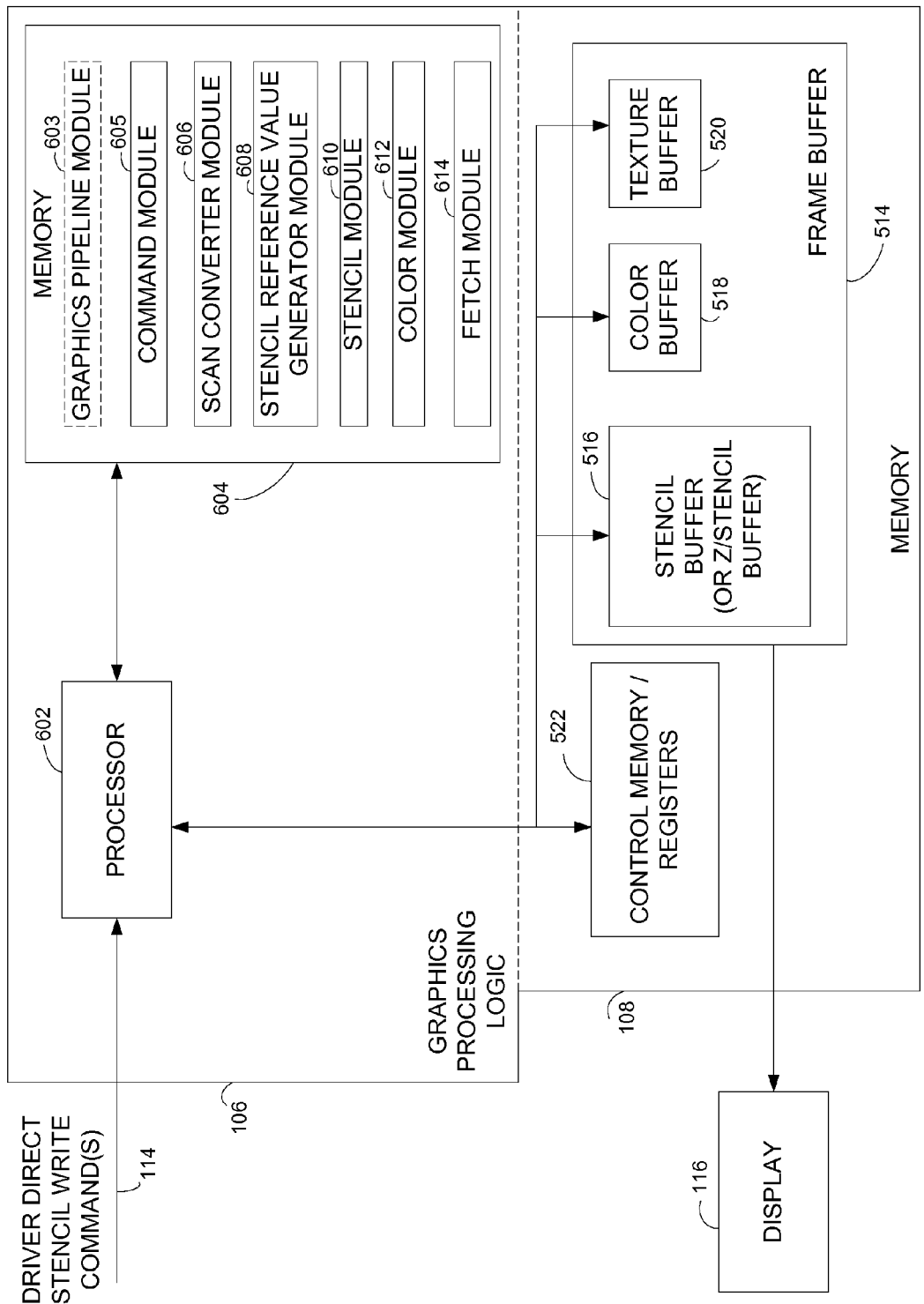
FIG. 6 is a block diagram illustrating a specific example of graphics processing logic of FIG. 5 implemented as one or more processors coupled to memory including software modules having executable instructions therein for execution on the one or more processors.

FIG. 6 is a block diagram illustrating a specific example of graphics processing logic 106 of FIG. 5 implemented as one or more processors ("processor") 602, similar to processor 206, coupled to memory 604, similar to memory 204. Memory 604 including software modules 603 and 605-614 having executable instructions therein for execution on processor 602. With respect to FIG. 5, FIG. 6 illustrates: (a) command logic 502 as command module 605 capable of executing on processor 602; (b) graphics pipeline logic 503 as graphics pipeline module 603 capable of executing on processor 602; (c) scan converter logic 504 as scan converter module 606 capable of executing on processor 602, (d) stencil reference value generator logic 506 as stencil reference value generator module 608 capable of executing on processor 602; (e) stencil logic 508 as stencil module 610 capable of executing on processor 602; (f) color logic 510 as color module 612 capable of executing on processor 602; and (g) fetch logic 512 as fetch module 614 capable of executing on processor 602. Each of the above-listed modules contains executable instructions written in any suitable programming language such that they are capable of being executed on processor 602. While FIG. 6 shows each of the GPL blocks of FIG. 5 as modules 603, 605-614 capable of executing on processor 602, it is contemplated that any combination of GPL blocks and modules capable of execution on processor 602 may be implemented in accordance with the present disclosure. It is therefore contemplated that any buses and couplings illustrated in FIG. 5 may also be used in this alternate embodiment.

Figure 7:
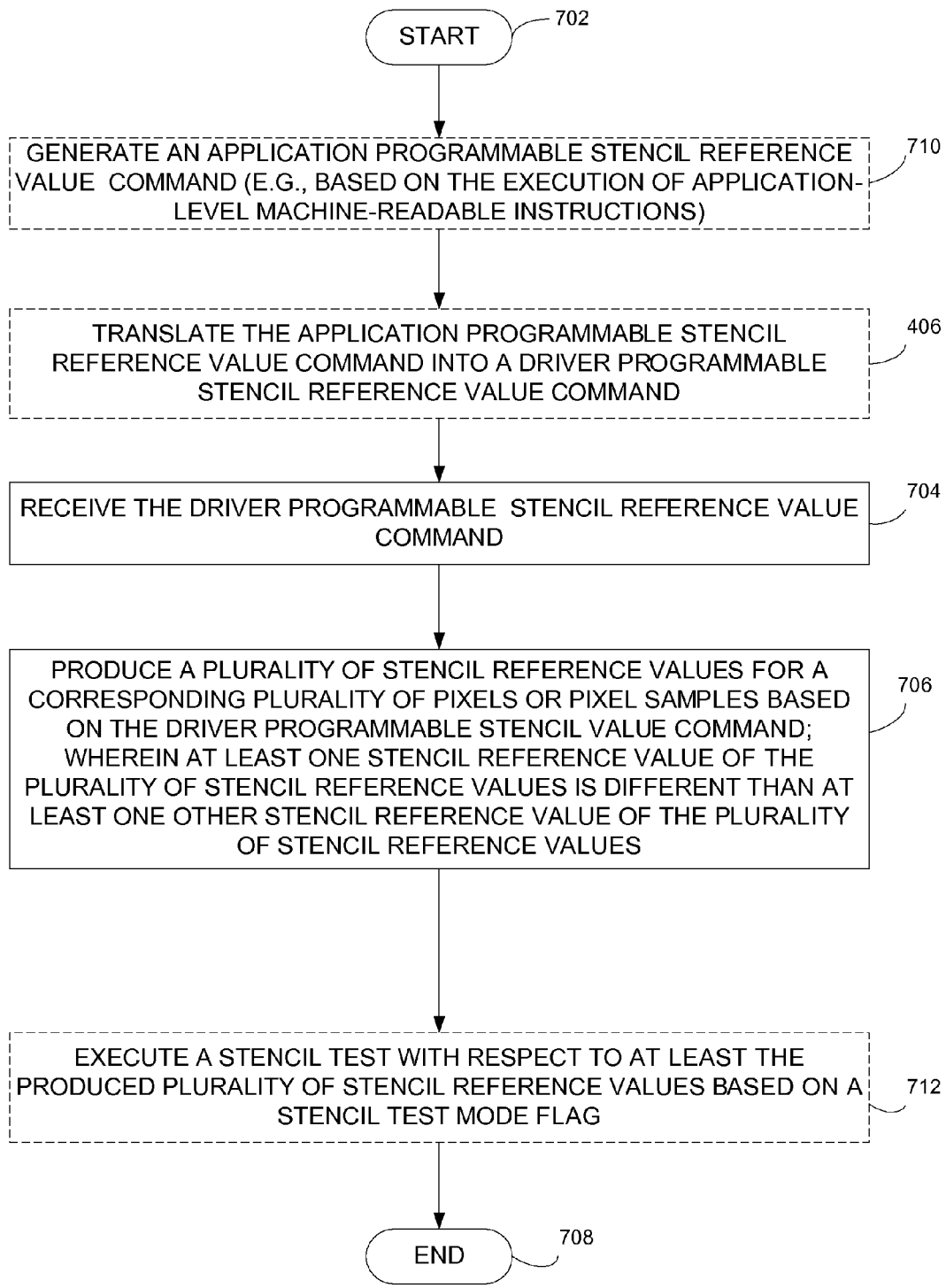
FIG. 7 is a flow chart illustrating one example of producing a plurality of stencil reference values for a corresponding plurality of pixels or pixel samples based on a driver programmable stencil reference value in accordance with one embodiment of the present disclosure.

FIG. 7 is a flow chart illustrating one example of producing a plurality of stencil reference values for a corresponding plurality of pixels or pixel samples based on a driver programmable stencil reference value in accordance with one embodiment of the present disclosure. The method begins in block 702 wherein, for example, an application is being executed on a host processor or processors. In one example, this corresponds to processor 206 of FIG. 2 executing application module 208. Next, the method includes receiving a driver programmable stencil reference value command in block 704. In one embodiment, driver programmable stencil reference value command 114 is sent by driver logic 102 of FIG. 1 or any other suitable logic over any suitable coupling and is received by graphics processing logic 106 and specifically command logic 502 of FIG. 5. In one embodiment, prior to receipt of a driver programmable stencil reference value command, the method further comprises blocks 710 and 406. Block 710 corresponds to generating an application programmable stencil reference value command similar to previously presented in block 306.

The method continues in block 708 wherein a plurality of stencil reference values are produced for a corresponding plurality of pixels or pixel samples based on the driver programmable stencil reference value command, wherein at least one stencil reference value of the plurality of stencil reference values is different than at least one other stencil reference value of the plurality of stencil reference values. In one embodiment, this is implemented as described above with respect to FIGS. 5 and 6. The method may optionally include block 712 wherein a stencil test is executed with respect to at least the produced plurality of stencil reference values based on a stencil test mode flag. For example, a stencil test may be performed by stencil logic 508 of FIG. 5 based on a stencil test mode flag that indicates a specified stencil test to be performed. In one embodiment, the stencil test may be configured to always pass and the corresponding stencil operation may result in a direct writing of the produced stencil reference value to a stencil buffer. In this embodiment, the stencil operation may cause the stencil logic 508 to directly write the stencil reference value without comparing it to any previously stored stencil value. In another embodiment, the stencil test may require a comparison to a stencil value (stored in stencil buffer) before any stencil operation is performed. Thereafter the method ends in block 708. In one embodiment, the stencil values stored in the stencil buffer (e.g., stencil buffer 516) may be used to produce a suitable image on display 116 using known techniques in the art.

Accordingly, a method and apparatus have been disclosed that provides great flexibility of design and operation of application logic, driver logic and graphics processing logic. By allowing for the production of a plurality of stencil reference values for a corresponding plurality of pixels or pixel samples, wherein at least one of the stencil reference values of the plurality is different than at least one other stencil reference value of the same plurality, the above-identified needs of the prior art are satisfied. That is, the above method and apparatus allows for ease in moving stencil values from a stencil buffer and for easily writing back the values to the buffer when graphics processing logic employs stencil logic with proprietary formatting schemes and/or proprietary compression schemes.

Additionally, the provision of the plurality of stencil reference values provides an application designer more flexibility in programming. A variety of stencil tests and operations may be performed on the plurality of stencil reference values such that certain pixels or pixel samples in a graphics objects are identified for processing while others are passed over.

It should be understood that these and other advantages may be obtained by the above disclosure; the invention is not limited by the specific embodiments described above. The implementation of other variations and modifications of the disclosure in its various aspects will be apparent to those of ordinary skill in the art. For example, the data paths illustrated in FIG. 5 may be used in one or more embodiments to pass additional data or information for rendering or graphics processing. Further, it may be appreciated that the driver programmable stencil reference value command may not be the result of a translation from a corresponding application programmable stencil reference value command. It is recognized that the driver programmable stencil reference value command may be the output of application logic in the event that driver logic is not needed (e.g., where the CPU or application logic and GPU or the graphics processing logic are already compatible with one another without the need for a driver).

What is claimed is:

1. An apparatus comprising:
application logic, including logic circuitry, operative to generate an application programmable stencil reference value command;
wherein the application logic is operatively coupleable to graphics processing logic capable of producing a plurality of stencil reference values for a corresponding plurality of pixels or pixel samples based on the application programmable stencil reference value command; and
wherein the application programmable stencil reference value command includes at least instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

2. The apparatus of claim 1, wherein:
the application logic is operatively coupleable to driver logic capable of translating the application programmable stencil reference value command into a driver programmable stencil reference value command;
the driver programmable stencil reference value command includes:
a reference to instruction data stored in memory; or
the instruction data;
and
the graphics processing logic is capable of producing the plurality of stencil reference values based on the instruction data.

3. The apparatus of claim 2, wherein the graphics processing logic is capable of producing the plurality of stencil reference values based on the instruction data by:
reading the plurality of stencil reference values from the memory based at least on a location of each of the corresponding plurality of pixels or pixel samples; or
generating the plurality of stencil reference values based at least on the location of each of the corresponding plurality of pixels or pixel samples.

4. The apparatus of claim 2, wherein the driver programmable stencil reference value command includes a stencil test mode flag capable of instructing the one or more graphics processing logic components to execute a stencil test with respect to at least the produced plurality of stencil reference values based on the stencil test mode flag.

5. Non-transitory memory comprising executable instructions capable of being executed by one or more processors such that, when the executable instructions are executed by the one or more processors, the executable instructions cause the one or more processors to:
generate an application programmable stencil reference value command;
wherein the application programmable stencil reference value command is capable of controlling graphics processing logic to produce a plurality of stencil reference values for a corresponding plurality of pixels or pixel samples; and
wherein the application programmable stencil reference value command includes at least instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

6. The memory of claim 5, wherein:
the application programmable stencil reference value command is capable of being translated into a driver programmable stencil reference value command;
the driver programmable stencil reference value command includes:
a reference to instruction data stored in memory; or
the instruction data;
and
the instruction data is capable of causing the graphics processing logic to produce the plurality of stencil reference values.

7. An apparatus comprising:
one or more processors operatively coupled to memory;
wherein the memory comprises executable instructions such that, when executed by the one or more processors, the executable instructions cause the one or more processors to:
generate an application programmable stencil reference value command;
wherein the application programmable stencil reference value command is capable of controlling graphics processing logic to produce a plurality of stencil reference values for a corresponding plurality of pixels or pixel samples; and wherein the application programmable stencil reference value command includes at least instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

8. A method comprising:
generating an application programmable stencil reference value command;
wherein the application programmable stencil reference value commands controls graphics processing logic circuitry to produce a plurality of stencil reference values for a corresponding plurality of pixels or pixel samples; and
wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

9. The method of claim 8, where generating an application programmable stencil reference value command is based on previously executed application-level machine-readable instructions.

10. An apparatus comprising:
driver logic, including logic circuitry, operative to translate an application programmable stencil reference value command into a driver programmable stencil reference value command;
wherein the driver programmable stencil reference value command is capable of controlling graphics processing logic to produce a plurality of stencil reference values for a corresponding plurality of pixels or pixel samples; and
wherein the application programmable stencil reference value command includes at least instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

11. The apparatus of claim 10, wherein:
the driver programmable stencil reference value command includes:
a reference to instruction data stored in memory; or
the instruction data;
and
the instruction data is capable of causing the graphics processing logic to produce the plurality of stencil reference values.

12. The apparatus of claim 11, wherein the instruction data is capable of causing the graphics processing logic to produce the plurality of stencil reference values based on the instruction data by:
reading the plurality of stencil reference values from the memory based at least on a location of each of the corresponding plurality of pixels or pixel samples; or
generating the plurality of stencil reference values based at least on the location of each of the corresponding plurality of pixels or pixel samples.

13. The apparatus of claim 10, further comprising the graphics processing logic.

14. The apparatus of claim 10, further comprising application logic operative to generate the application programmable stencil reference value command.

15. The apparatus of claim 14, further comprising graphics processing logic operatively coupled to the driver logic and operative to produce the plurality of stencil reference values based on the driver programmable stencil reference value command.

16. Non-transitory memory comprising executable instructions capable of being executed by one or more processors such that, when the executable instructions are executed by the one or more processors, the executable instructions cause the one or more processors to:
translate an application programmable stencil reference value command into a driver programmable stencil reference value command;
wherein the driver programmable stencil reference value command is capable of controlling graphics processing logic to produce a plurality of stencil reference values for a corresponding plurality of pixels or pixel samples; and
wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

17. An apparatus comprising:
one or more processors operatively coupled to memory;
wherein the memory comprises executable instructions such that, when executed by the one or more processors, the executable instructions cause the one or more processors to:
translate an application programmable stencil reference value command into a driver programmable stencil reference value command;
wherein the driver programmable stencil reference value command is capable of controlling graphics processing logic to produce a plurality of stencil reference values for a corresponding plurality of pixels or pixel samples; and
wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

18. The apparatus of claim 17, wherein:
the driver programmable stencil reference value command includes:
a reference to instruction data stored in memory; or
the instruction data;
and
the instruction data is capable of causing the graphics processing logic to produce the plurality of stencil reference values.

19. A method comprising:
receiving an application programmable stencil reference value command; and translating the application programmable stencil reference value command into a driver programmable stencil reference value command;

wherein the driver programmable stencil reference value command controls graphics processing logic circuitry to produce a plurality of stencil reference values for a corresponding plurality of pixels or pixel samples; and wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

20. An apparatus comprising:

command logic, including logic circuitry, operatively coupled to receive a driver programmable stencil reference value command;

stencil reference value generator logic operative to produce a plurality of stencil reference values for a corresponding plurality of pixels or pixel samples based on the driver programmable stencil reference value command; and wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

21. The apparatus of claim 20, wherein:

the driver programmable stencil reference value command includes:
  reference to instruction data stored in memory; or
  the instruction data;
and
the stencil reference value generator is operative to produce the plurality of stencil reference values for the corresponding plurality of pixels or pixel samples based on the instruction data.

22. The apparatus of claim 21, further comprising:

scan converter logic operatively coupled to the command logic and to the stencil reference value generator logic;

wherein the driver programmable stencil reference value command includes:
  vertex location data for one or more primitives of which the corresponding plurality of pixels or pixel samples comprise; or
  a reference to the vertex location data stored in the memory; and wherein the scan converter logic is operative to generate location data for each pixel or each pixel sample of the corresponding plurality of pixels or pixel samples based on the vertex location data.

23. The apparatus of claim 22, wherein the stencil reference value generator is operative to produce the plurality of stencil reference values based on the instruction data by:

reading the plurality of stencil reference values from the memory based at least on the location data for each pixel or each pixel sample of the corresponding plurality of pixels or pixel samples; or generating the plurality of stencil reference values based at least on the location data for each pixel or each pixel sample of the corresponding plurality of pixels or pixel samples.

24. The apparatus of claim 23, further comprising:

fetch logic operatively coupled to the memory and to the stencil reference value generator logic; and wherein the stencil reference value generator logic is operative to read the plurality of stencil reference values from the memory by issuing an fetch instruction to the fetch logic, and wherein the fetch logic is operative to read the plurality of stencil reference values from the memory in response to the fetch instruction.

25. The apparatus of claim 20, further comprising:

stencil logic operatively coupled to the stencil reference value generator logic by an export bus;

wherein the driver programmable stencil reference value command includes an export bus enable flag; and wherein the stencil reference value generator logic is operative to transmit the plurality of stencil reference values to the stencil logic along the export bus based on the export bus enable flag.

26. The apparatus of claim 25, wherein:

the driver programmable reference value command includes a stencil test mode flag; and the stencil logic is operative to execute a stencil test with respect to the produced plurality of stencil reference values based on the stencil test mode flag.

27. The apparatus of claim 20 further comprising driver logic operative to translate an application programmable stencil reference value command into the driver programmable stencil reference value command.

28. The apparatus of claim 27 further comprising application logic operative to generate the application programmable stencil reference value command.

29. Non-transitory memory comprising executable instructions capable of being executed by one or more processors such that, when the executable instructions are executed by the one or more processors, the executable instructions cause the one or more processors to:

receive a driver programmable stencil reference value command;

produce a plurality of stencil reference values for a corresponding plurality of pixels or pixel samples based on the driver programmable stencil reference value command; and wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

30. The memory of claim 29, wherein the driver programmable stencil reference value command includes:
  reference to instruction data stored in memory; or
  the instruction data;
and
the executable instructions further cause the one or more processors to produce the plurality of stencil reference values based on the instruction data.

31. The memory of claim 30, wherein:

the drive programmable stencil reference value command includes:
  vertex location data for one or more primitives of which the corresponding plurality of pixels or pixel samples comprise; or
  a reference to the vertex location data stored in the memory;

and the executable instructions further cause the one or more processors to generate location data for each pixel or each pixel sample of the corresponding plurality of pixels or pixel samples based on the vertex location data.

32. The memory of claim 31, wherein the executable instructions further cause the one or more processors to produce the plurality of stencil reference values based on the instruction data by:

reading the plurality of stencil reference values from the memory based at least on the location data for each pixel or each pixel sample of the corresponding plurality of pixels or pixel samples; or generating the plurality of stencil reference values based at least on the location data for each pixel or each pixel sample of the corresponding plurality of pixels or pixel samples.

33. The memory of claim 29, wherein:

the driver programmable reference value command includes a stencil test mode flag; and the one or more processors are operative to execute a stencil test with respect to at least the produced plurality of stencil reference values based on the stencil test mode flag.

34. The memory of claim 29, wherein the executable instructions further cause the one or more processors to translate an application programmable stencil reference value command into the driver programmable stencil reference value command.

35. An apparatus comprising:

one or more processors operatively coupled to memory;

wherein the memory comprises executable instructions such that, when executed by the one or more processors, the executable instructions cause the one or more processors to:

receive a driver programmable stencil reference value command;

produce a plurality of stencil reference values for a corresponding plurality of pixels or pixel samples based on the driver programmable stencil reference value command; and wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

36. A method comprising:

receiving, with graphics processing logic circuitry, a driver programmable stencil reference value command;

producing, with the graphics processing logic circuitry, a plurality of stencil reference values for a corresponding plurality of pixels or pixel samples based on the driver programmable stencil reference value command; and wherein the application programmable stencil reference value command includes instruction data or a pointer to instruction data, vertex location data or a reference to vertex location data, an export bus enable flag and a stencil test mode flag, and wherein at least one stencil reference value of the plurality of stencil reference values is different than at least one other stencil reference value of the plurality of stencil reference values.

\* \* \* \* \*